(12) United States Patent
Polonsky et al.

(10) Patent No.: US 8,918,391 B2
(45) Date of Patent: Dec. 23, 2014

(54) INTERACTIVE PEER DIRECTORY WITH QUESTION ROUTER

(75) Inventors: Nir Polonsky, Ridgefield, CT (US); Brian Keif, Maitland, FL (US); Girish Malangi, Bridgewater, NJ (US); Maria Patterson, Birchgrove (AU); Andrew Rosenblatt, Norwalk, CT (US); Malini Vittal, San Diego, CA (US)

(73) Assignee: Gartner, Inc., Stamford, CT (US)

( * ) Notice: Subject to any disclaimer, the term of this patent is extended or adjusted under 35 U.S.C. 154(b) by 189 days.

(21) Appl. No.: 13/532,936

(22) Filed: Jun. 26, 2012

(65) Prior Publication Data

US 2012/0272164 A1 Oct. 25, 2012

Related U.S. Application Data

(63) Continuation-in-part of application No. 12/592,799, filed on Dec. 2, 2009, now Pat. No. 8,244,674.

(60) Provisional application No. 61/601,085, filed on Feb. 21, 2012.

(51) Int. Cl.
*G06F 17/30* (2006.01)
*G06Q 10/10* (2012.01)
*G06Q 50/00* (2012.01)
*H04L 12/58* (2006.01)
*H04L 12/18* (2006.01)
*H04L 29/08* (2006.01)

(52) U.S. Cl.
CPC .......... *G06F 17/30654* (2013.01); *G06Q 10/10* (2013.01); *G06Q 50/01* (2013.01); *H04L 51/28* (2013.01); *H04L 51/14* (2013.01); *G06F 17/30206* (2013.01); *H04L 12/1831* (2013.01); *H04L 67/306* (2013.01); *Y10S 707/967* (2013.01)
USPC ............ 707/732; 707/733; 707/734; 707/967

(58) Field of Classification Search
USPC ........... 707/733, 734, 758, 969; 709/204, 227
See application file for complete search history.

(56) References Cited

U.S. PATENT DOCUMENTS

| | | | |
|---|---|---|---|
| 5,983,214 A | 11/1999 | Lang et al. | |
| 6,029,161 A | 2/2000 | Lang et al. | |
| 6,078,928 A | 6/2000 | Schnase et al. | |
| 6,112,186 A | 8/2000 | Bergh et al. | |
| 6,175,842 B1 | 1/2001 | Kirk et al. | |
| 6,236,978 B1 | 5/2001 | Tuzhilin | |
| 6,236,980 B1 | 5/2001 | Reese | |
| 6,266,649 B1 | 7/2001 | Linden et al. | |
| 6,308,175 B1 | 10/2001 | Lang et al. | |

(Continued)

*Primary Examiner* — Leslie Wong
(74) *Attorney, Agent, or Firm* — Lipsitz & McAllister, LLC

(57) ABSTRACT

A computer network implemented peer forum system and method enabling question and answer rates to be increased by automatically routing questions and receiving answers to and from peers. Information is input into network via a user interface. A peer forum system enables users to ask and answer questions. A forums database captures questions and answers provided via the peer forum system. A stage database pulls and stores questions from the forums database. A question router pulls the questions from the stage database and finds peers who can answer the questions using a peer search module that uses implicit and explicit user profiles to determine the best subject matter experts to answer the questions. A set of throttle rules is associated with the question router for determining if a peer is eligible to answer a question. A delivery system delivers a communication to eligible peers requesting an answer to the question.

16 Claims, 8 Drawing Sheets

(56) References Cited

U.S. PATENT DOCUMENTS

| | | |
|---|---|---|
| 6,314,420 B1 | 11/2001 | Lang et al. |
| 6,389,372 B1 | 5/2002 | Glance et al. |
| 7,016,307 B2 | 3/2006 | Vasudev et al. |
| 7,035,838 B2 | 4/2006 | Nelson et al. |
| 7,043,443 B1 | 5/2006 | Firestone |
| 7,047,202 B2 | 5/2006 | Jaipuria et al. |
| 7,069,308 B2 | 6/2006 | Abrams |
| 7,167,910 B2 | 1/2007 | Farnham et al. |
| 7,177,880 B2 | 2/2007 | Ruvolo et al. |
| 7,188,153 B2 | 3/2007 | Lunt et al. |
| 7,249,123 B2 | 7/2007 | Elder et al. |
| 7,269,590 B2 | 9/2007 | Hull et al. |
| 7,275,102 B2 | 9/2007 | Yeager et al. |
| 7,315,826 B1 | 1/2008 | Guheen et al. |
| 7,359,894 B1 | 4/2008 | Liebman et al. |
| 7,451,161 B2 | 11/2008 | Zhu et al. |
| 7,454,433 B2 | 11/2008 | Ebert |
| 7,499,903 B2 | 3/2009 | Nevin et al. |
| 7,512,628 B2 | 3/2009 | Chess et al. |
| 7,657,907 B2 | 2/2010 | Fennan et al. |
| 7,680,820 B2 | 3/2010 | Denoue et al. |
| 7,917,503 B2 | 3/2011 | Mowatt et al. |
| 7,966,316 B2 * | 6/2011 | Cao et al. .................. 707/721 |
| 8,244,674 B2 * | 8/2012 | Davis et al. .................. 707/622 |
| 8,311,835 B2 * | 11/2012 | Lecoeuche ................ 704/270.1 |
| 2002/0087632 A1 | 7/2002 | Keskar |
| 2002/0194018 A1 | 12/2002 | Scott |
| 2003/0093294 A1 | 5/2003 | Passantino |
| 2004/0015329 A1 | 1/2004 | Shayegan et al. |
| 2004/0073918 A1 | 4/2004 | Ferman et al. |
| 2005/0050227 A1 | 3/2005 | Michelman |
| 2005/0182743 A1 | 8/2005 | Koenig |
| 2005/0240580 A1 | 10/2005 | Zamir et al. |
| 2006/0085373 A1 | 4/2006 | Dhillion et al. |
| 2006/0179112 A1 | 8/2006 | Weyer et al. |
| 2006/0200434 A1 | 9/2006 | Flinn et al. |
| 2007/0060109 A1 | 3/2007 | Ramer et al. |
| 2008/0005075 A1 * | 1/2008 | Horvitz et al. .................. 707/3 |
| 2008/0005103 A1 | 1/2008 | Ratcliffe et al. |
| 2008/0046555 A1 * | 2/2008 | Datta et al. .................. 709/223 |
| 2008/0077461 A1 * | 3/2008 | Glick .................. 705/7 |
| 2008/0104004 A1 | 5/2008 | Brave et al. |
| 2008/0104030 A1 | 5/2008 | Choi et al. |
| 2008/0215623 A1 | 9/2008 | Ramer et al. |
| 2008/0288494 A1 | 11/2008 | Brogger et al. |
| 2008/0294607 A1 | 11/2008 | Partovi et al. |
| 2009/0018851 A1 | 1/2009 | Greenfield |
| 2009/0031030 A1 * | 1/2009 | Schmidt .................. 709/227 |
| 2009/0100047 A1 | 4/2009 | Jones et al. |
| 2009/0299812 A1 * | 12/2009 | Ray .................. 705/9 |
| 2010/0105315 A1 | 4/2010 | Albrett |
| 2010/0169148 A1 * | 7/2010 | Oberhofer et al. .................. 705/9 |
| 2010/0205541 A1 * | 8/2010 | Rapaport et al. .................. 715/753 |
| 2011/0113094 A1 * | 5/2011 | Chunilal .................. 709/204 |
| 2011/0162038 A1 * | 6/2011 | Chunilal .................. 726/1 |
| 2011/0191311 A1 | 8/2011 | Polonsky et al. |
| 2011/0231488 A1 * | 9/2011 | Xu .................. 709/204 |
| 2011/0307478 A1 * | 12/2011 | Pinckney et al. .................. 707/724 |
| 2012/0197813 A1 * | 8/2012 | Kurtzig et al. .................. 705/318 |
| 2012/0311139 A1 * | 12/2012 | Brave et al. .................. 709/224 |
| 2012/0316940 A1 * | 12/2012 | Moshfeghi .................. 705/14.16 |
| 2012/0331052 A1 * | 12/2012 | Rathod .................. 709/204 |
| 2013/0096937 A1 * | 4/2013 | Campbell et al. .................. 705/2 |
| 2013/0124449 A1 * | 5/2013 | Pinckney et al. .................. 706/52 |
| 2014/0006372 A1 * | 1/2014 | Ickman et al. .................. 707/708 |
| 2014/0038725 A1 * | 2/2014 | Mizrahi et al. .................. 463/42 |

* cited by examiner

INTERACTIVE PEER DIRECTORY WITH QUESTION ROUTER

CROSS REFERENCE

This application is a continuation-in-part of commonly owned, co-pending U.S. patent application Ser. No. 12/592,799 filed on Dec. 2, 2009, and claims the benefit of U.S. Provisional Patent Application No. 61/601,085 filed on Feb. 21, 2012, the entire contents of which are incorporated herein by reference.

BACKGROUND OF THE INVENTION

The present invention relates to an interactive peer directory implemented on a digital computer. The directory provides for the online location of peers with expertise in a particular business or endeavor. Once qualified peers are located, connections to such peers can be requested for project, product and implementation advice and the like. The "Question Router" of the present invention is an extension of the Peer Directory disclosed in the above-identified parent applications and enables an increase in the Question and Answer rates in a peer forum system. The Question Router accomplishes this result by automatically sending the questions to the most appropriate subject matter experts in the Peer Directory.

Various tools for arranging business introductions are known in the art. For example, J. Greenfield U.S. Patent Publication No. 2009/0018851 discloses a network that uses registration information of multiple parties along with a matching function to match two parties that have a business contact that both parties would benefit from if the parties were introduced. Procedures are provided to notify the parties of a potential match, and to facilitate communication between the parties if the introduction is accepted by the parties.

U.S. Pat. No. 7,454,433 to Ebert discloses a system for providing adaptive virtual communities. By determining a technical or business context of a particular user, the system is able to match that user with other users who are likely to be able to assist the user within that context.

U.S. Pat. No. 7,035,838 to Nelson et al. discloses methods and systems for organizing information stored within a computer network-based system. Documentation relating to a plurality of topics and a list of experts on a plurality of topics is stored in a centralized database. A user interface enables a user to search the database for a specific item of information by at least one of a work function, a functional category and a community.

Prior art systems, such as those referenced above, generally provide too many potential matches between a requester and available contacts. The requester will then have to sort through these many potential matches to attempt to find a match that will be most relevant. Such systems can waste the requester's time and may not result in the best match being found, since the requester may settle for a less relevant match instead of carefully considering each of the many potential matches presented. Moreover, once a match is selected by a requester, the individual associated with that match may not respond to a request by the requester to communicate. This can waste more time, as the requester may wait several days to hear back from the match, only to find that no response is ever received. The requester will then have to find another match, with no assurance that the individual associated with the new match will be likely to respond to a request to communicate.

The present invention addresses the lack of a healthy question and answer rate in a web based community forum. A good question and answer ("Q&A") rate is necessary to keep the community dynamic and healthy. Typically community managers play a big role in keeping the community dynamic by answering questions or facilitating the answering of questions. This can be a very manual and time intensive process. It would be advantageous to increase the question and answer rates in a community forum in an automated fashion, thereby cutting down the amount of manual intervention.

In an improved system contemplated by the present invention, clients (peers) consist of a highly respected set of experts in their areas. Peers are encouraged to post their questions/thoughts on the community Q&A forums. A system in accordance with the present invention can then used to help increase the engagement of community members in the forums and get their questions answered.

It would be advantageous to provide improved apparatus and methods for routing questions posted by peers to other peers in the community that can assist a user in solving a business or technical problem. It would be further advantageous if such apparatus and methods would provide more relevant matches to the requester, to increase the likelihood that a helpful peer will respond to the questions quickly and efficiently. It would be still further advantageous if potential matches presented to the requester comprise peers that are more likely than not to respond to a request to communicate with the requester. In particular, it would be advantageous to increase the question and answer rates in a community forum in an automated fashion, thereby cutting down the amount of manual intervention.

The present invention provides an interactive peer directory that enjoys the aforementioned and other advantages.

SUMMARY OF THE INVENTION

In accordance with the invention, a peer directory system is provided. The system is implemented on a digital computer network. A user interface enables user profile information to be entered and stored in a profiles database. A search engine is adapted to append tags to the user profile information. The search engine can comprise, for example, a computer processor and software to implement a search function. A search index is associated with the search engine for storing tagged user profile information in an indexed form. A peer relevancy algorithm is associated with the search engine to search for candidate peers among the indexed user profile information stored in the search index. The peer relevancy algorithm assigns weights to candidate peers based on different categories of the indexed user profile information, and selects peer matches based on the assigned weights.

In an illustrated embodiment, a first weight is assigned to candidate peers who have a best initiative match with a user searching for peers. The "initiative" can be, for example, a project or venture that the user is currently working on for an enterprise such as an employer. A second weight is assigned to candidate peers who have a best vendor/product match with the user searching for peers. A third weight is assigned to candidate peers who have a best primary operating system (OS) match (e.g., Windows, Mac OS X, SunOS, Linux, Unix, etc.) with the user searching for peers. A fourth weight is assigned to candidate peers who have a best industry match with the user searching for peers. A fifth weight is assigned to candidate peers who have a best firm size match (e.g., size of employer by number of employees, sales revenue, etc.) with the user searching for peers.

The first, second, third, fourth and fifth weights can be summed across all tags for the candidate peers in order to provide a composite weight for each candidate peer. The candidate peers can then be sorted by their composite weights.

In a preferred embodiment of the invention, the search index stores information indicative of past connection responses for candidate peers. Based on this information, the peer relevancy algorithm provides either (a) a negative bias to candidate peers that have poor past connection responses, or (b) a positive bias to candidate peers that have good past connection responses.

The user interface may comprise a display processor for providing display information indicative of best matched peers and allowing information about the best matched peers to be viewed and filtered by a user searching for peers. The user interface may also comprise any suitable type of data entry means such as a keyboard, mouse, touch screen, or the like.

The peer relevancy algorithm can be implemented such that it is responsive to a request entered via the user interface to select a peer match for a requester. In such an embodiment, the algorithm will return peer matches to the requester via the user interface. The user interface can be implemented to enable the requester to request connection to one or more peers identified by the peer matches. A communications processor, responsive to a peer connection requested by the requester, may be provided for (i) generating a connection request message to the applicable peer, (ii) receiving a reply from said applicable peer, (iii) if the applicable peer accepts the connection, sending a connection acceptance to the requester with contact information for the applicable peer, and (iv) if the applicable peer fails to accept the connection, sending a connection rejection to said requester.

In a preferred embodiment, the connection request message discloses at least one of the requester's company, industry, role or a personal message from the requester without disclosing the identity of the requester. Contact information for the requester is disclosed to the applicable peer only if the connection is accepted.

Various additional features of the invention include the ability of the user interface to allow a user to filter peer matches by at least one of industry, firm size, country, job role, vendor and product/service category. The weights assigned to the various candidate peers based on different categories of the indexed user profile information can be configurable to allow, e.g., for the tuning of the weights due to present or future circumstances. The negative and positive biases provided to candidate peers based on their past connection response history can also be configurable, e.g., to increase or decrease the significance of the bias in choosing peer matches for presentation (e.g., display) to a requester.

A method is disclosed for connecting peers having common interests. The method enables user profile information to be collected. Tags are appended to the user profile information. Tagged user profile information is stored in a profiles database in an indexed form. The profiles database is searched to identify candidate peers in response to a request for a peer match. The identification of candidate peers is based on correlations between a requester's user profile information and user profile information for the candidate peers. Weights are assigned to the candidate peers, and peer matches are selected based on the assigned weights.

In an illustrated embodiment, the weights assigned to candidate peers are based on at least one of best initiative match, best vendor match, best product match, best primary operating system (OS) match, best industry match and best firm size match. The weights assigned to candidate peers are summed for each such peer. The candidate peers are sorted by their composite weights.

Information indicative of past connection responses for candidate peers can be maintained. Based on this information, a negative bias can be provided to candidate peers that have poor past connection responses, and a positive bias can be provided to candidate peers that have good past connection responses.

In a further embodiment of the invention, individual clients have access to online peer forum systems. The system is implemented on a digital computer network and includes a user interface operatively associated with a digital computer for enabling questions to be input via the digital computer network. Access to such peer forum systems is generally restricted to a highly qualified set of individuals. Users have to register, provide profile information and login to access the forums. Users can ask questions on the forum and get relevant answers from their peers. A question router, which operates via a question router algorithm, is associated with the computer network to enable higher answer rates for questions posed by users. The question router algorithm is completely automated and routes input questions to the most relevant peers, thereby increasing the answer rates with no manual intervention. This also helps indirectly to increase the question rates since peers find their questions answered and thereby feeling confident about posing more questions.

A forums database is associated with the question router and captures all the questions and answers input by clients. At any given point in time, questions or answers can be looked up in this database. A second database pulls all open questions from the forums database into its own storage. Open questions are questions for which no reply has been made or no answer has been given. The system can also be designed to pull all questions and replies on a periodic basis. A peer search module pulls the open questions from the second database to find peers who can answer the questions. The peer search module consists of a recommendation engine and peer profile database modules.

The recommendation engine is able to find peers qualified to answer the questions. This is done using a combination of collaborative and cluster filtering algorithms. The recommendation engine takes into consideration both explicit and implicit profiles of a peer to figure out the peer's subject matter expertise. If the peer's subject matter expertise is the same as the open question, then he becomes a candidate to answer the open question. The Peer's subject matter profile is further strengthened by his propensity to answer questions on the peer forum system and his expertise as demonstrated in the peer forum systems.

The peer profile database module acts as input to the recommendation engine so that the qualified peer matches can be found. This database stores the user's explicit and implicit profile. The explicit profile comprises information that generally defines the user based on the user's own input. This is usually derived from registration forms where the user has input his industry experience, job titles and duty descriptions, size of company, company name, projects he is working on, vendors he is working with, etc. The implicit profile of a user is based on his behavior on the web site used to access the inventive system. This might include the research documents he has read, the alerts he has set up, the search terms he has used, etc.

After receiving open questions into the peer search module and receiving the peer recommendations from the recommendation engine, "throttle" rules are used to determine if each peer in a candidate set of peers can be sent an email encouraging them to answer the open questions. There might be rules that limit the number of emails that can be sent to a candidate, such as "only send three emails per person per week." The peers who can get past the throttle rules become eligible to be sent emails, requesting them to answer the questions. An email delivery system sends emails to the peers requesting them to answer the open questions. The email delivery system consists of email templates and email sending systems. A touch database captures all the sent emails. This data can be used in the future to figure out the number of emails sent to users and to adjust and/or derive email throttling rules.

Peer experts open the emails received from the email delivery system and find questions they can answer. The email will contain, for example, links which will take the peer experts to the open question where they can comment on or answer the question.

DETAILED DESCRIPTION OF THE INVENTION

Although the invention is described in connection with a preferred embodiment, it will be appreciated that numerous other embodiments and designs are possible as will be apparent to those skilled in the art.

In order to use the peer directory of the present invention, a user opts-in to the directory service via a user interface. The directory can reside on a server which is accessible via a network. Once the user is connected to the server, a user profile can be created, accessed and/or updated. The profile includes, for example, information relating to the product and/or vendor expertise of the user.

Once a profile is complete, a user can then use the inventive system to search the peer directory for peers with relevant product knowledge. Once suitable peers are found, a peer connection algorithm is used to initiate a connection to an identified peer through a network, such as via e-mail or the like. The connection may be made in an anonymous manner, through an intermediary. Bilateral consent to connect may be required, via the intermediary, prior to establishing communication between the user and the relevant peer(s).

Figure 1:
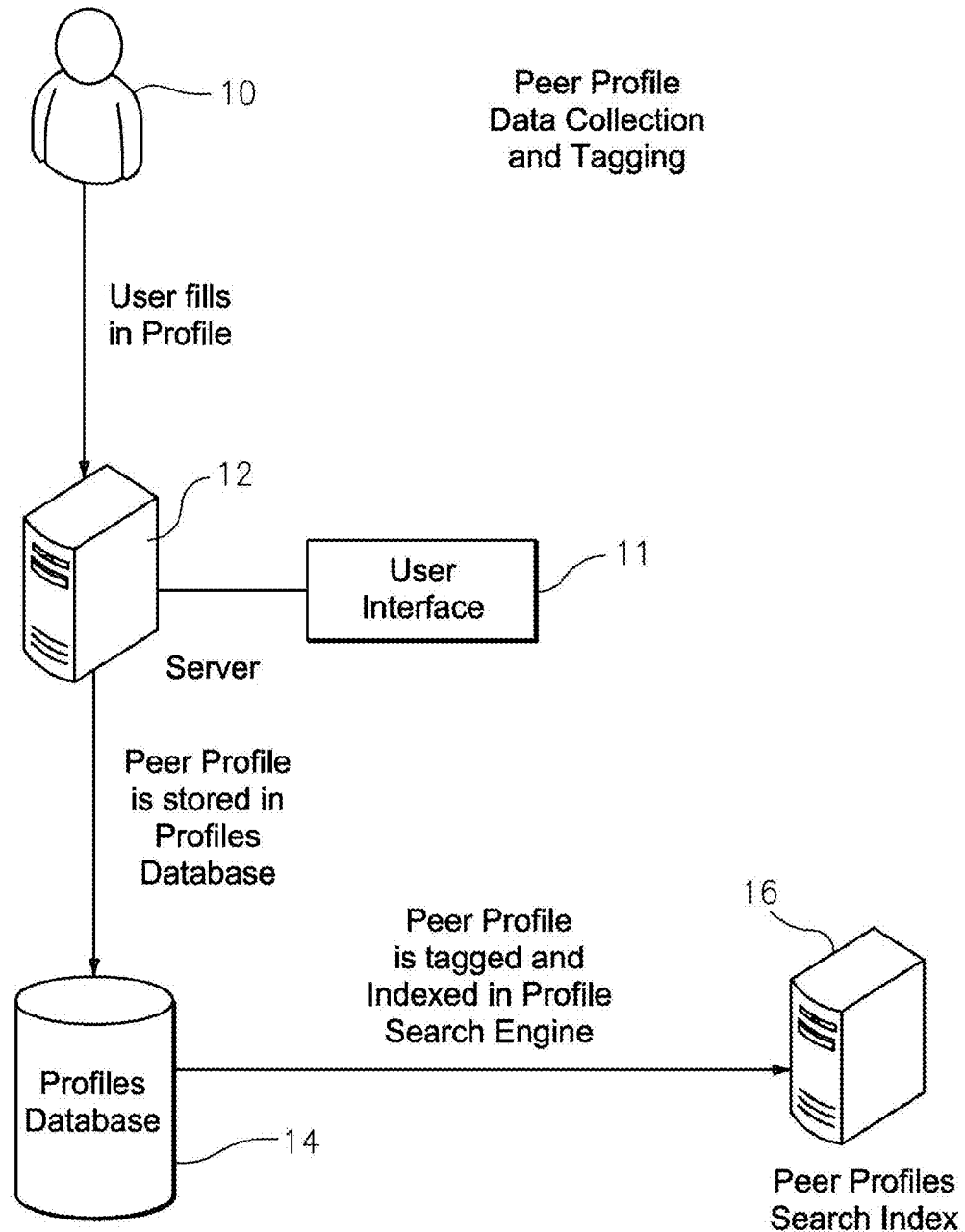
FIG. 1 is a block diagram of components of the inventive system relating to the collection and tagging of peer profile data.

FIG. 1 illustrates, in block diagram form, the main components of the inventive system that handle the collection and tagging of peer profile data. A user 10 fills in a profile template using a user interface 11. The user interface can comprise, for example, a graphic user interface (GUI) of a type well known in the art. A computer processor residing in a server 12 ("digital computer") generates the template for the user to complete. The template can request, for example, demographic information, information about the user's employer and industry ("firmographic" data), information about the user's professional interests and the like ("about me" data), information identifying what the user is working on at his or her job, information about products and services of interest to the user, and other categories of information.

The user's responses to the template are used to create a "peer profile" for the user. The peer profile for the user is stored, together with the profiles of other system users, in a profiles database 14, which can be maintained in a memory associated with the server 12. A search engine (e.g., hardware, firmware, and/or software) resident in server 16 maps the peer profile data for the user with metadata tags useful for searching the data. The tagged data is then stored in a peer profiles search index 16. The search index 16 can be implemented in another server or computer accessible to the server 12.

Figure 2:
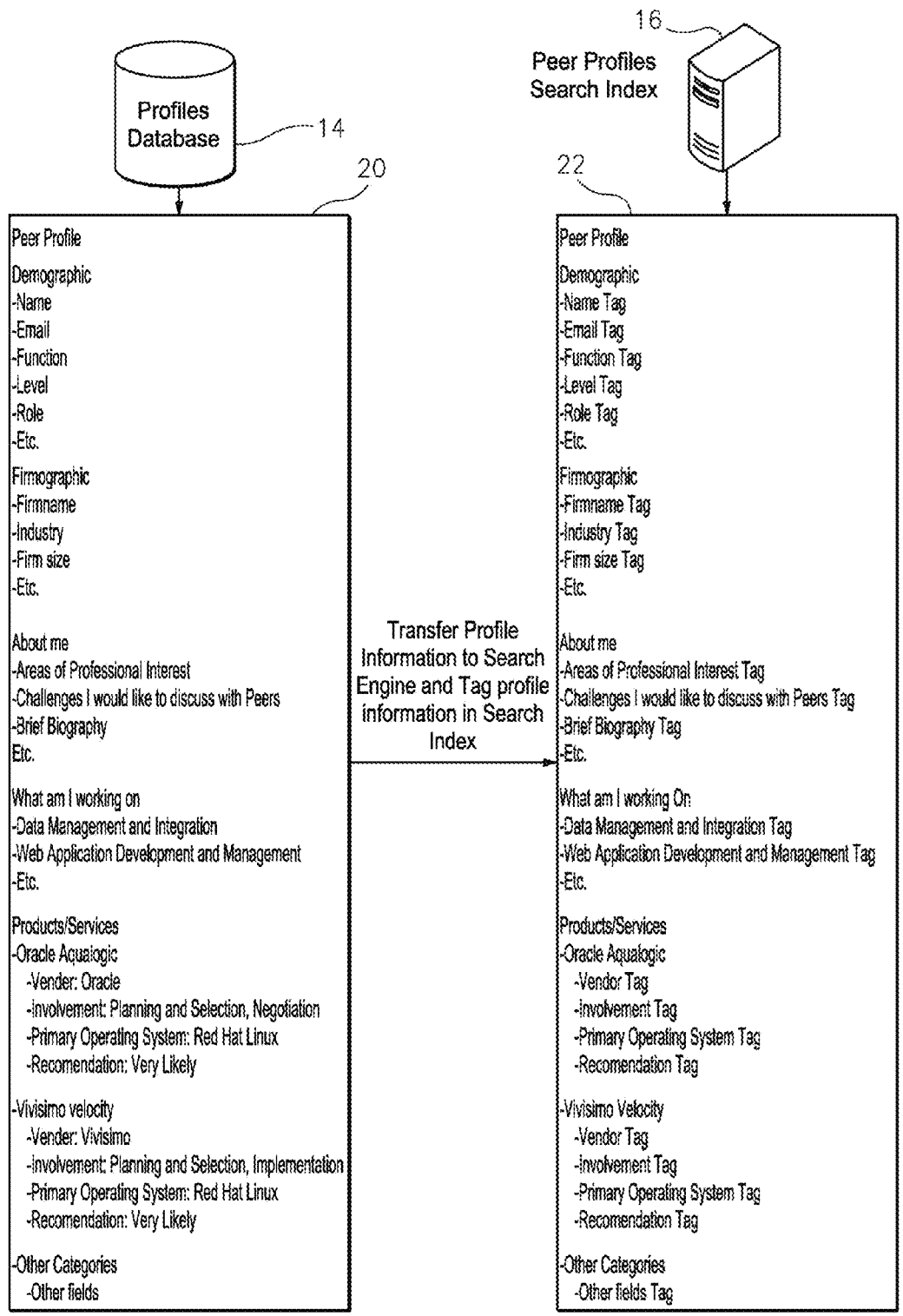
FIG. 2 is a block diagram illustrating example fields of the peer profile and example tags relating thereto.

FIG. 2 illustrates examples of the data that can be requested by the template for creating user profiles, as well as the tags that are provided for this data and stored in the peer profiles search index. As noted above, after entry via the user interface in response to the template, the user data ("peer profile") is stored together with the profiles of other system users in the profiles database 14. The stored data 20 includes, for example, demographic information for the user, including name, email address, job function, job level, role being served at job, and potentially other job related information. Also included in the stored data 20 is "firmographic" information relating to the user's employer, such as the firm name, industry, firm size, and the like. Another category of information included in the data 20 is "about me" information, including, for example, the user's areas of professional interest, challenges that the user would like to discuss with peers, a brief biography of the user, and similar data. A "what am I working on" category can include items such as the user's data management and integration projects, web application development and management responsibilities, and the like.

Another category of information that can be maintained for a user in the profiles database relates to products and services of interest to that user. For example, a user may be responsible for specifying, procuring and/or maintaining a business process management (BPM) suite and/or an enterprise search platform provided by a specific vendor, such as the Oracle Aqualogic suite or the Vivisimo Velocity search platform. This can be identified in the user's profile, together with pertinent information such as the vendor name, the user's involvement with the product, the primary operating system on which the suite is run and the user's recommendation for the product. Other categories of information can also be provided in the user's profile that will be useful in the search for a peer to assist the user in completing an assigned project.

The information in each user profile maintained in the profiles database 14 is transferred to a search engine (e.g., resident in server 16) that appends tag profile information to the user profile data. The tagged data is then stored in the peer profiles search index 16. In this manner, the search engine can search the tags stored in the peer profiles search index rather than searching all of the peer profile information itself in the profiles database. This design allows for much more efficient searching, higher relevancy and a quicker response when a requester queries the system for peer matches.

Figure 3:
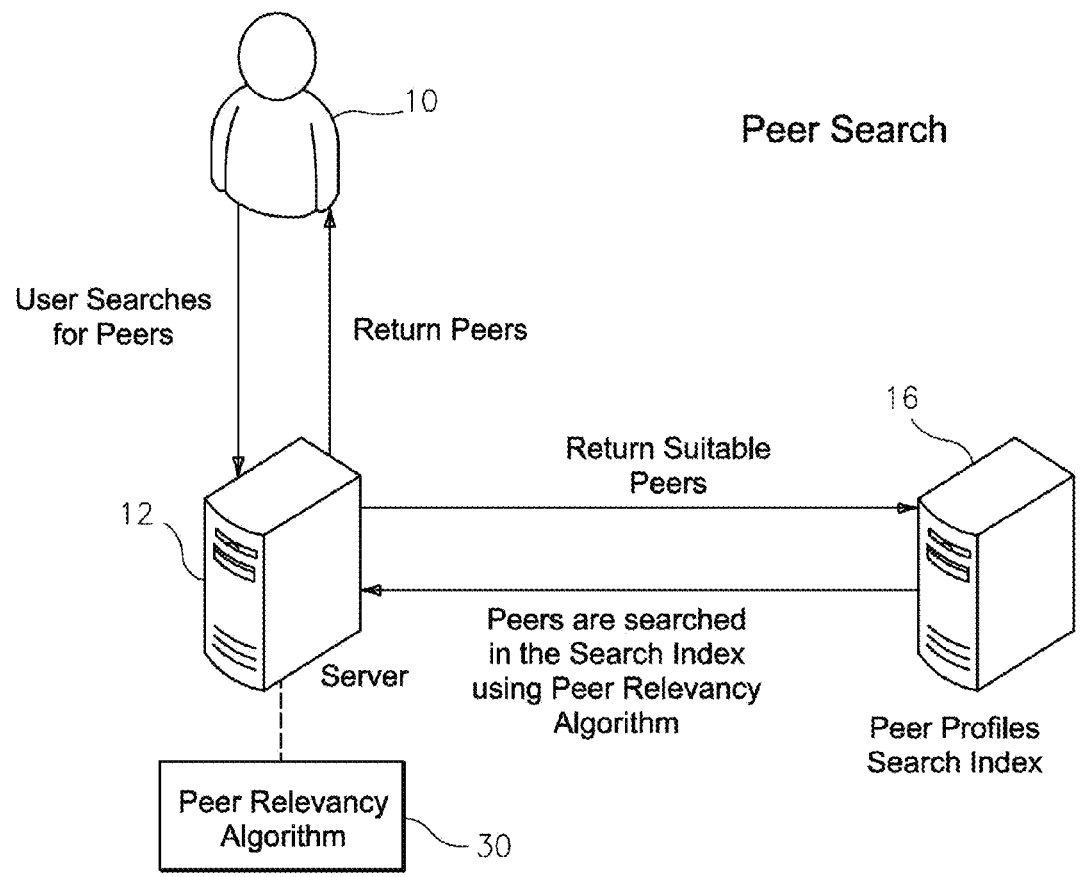
FIG. 3 is a block diagram of components of the inventive system relating to the search for peers.

FIG. 3 is a block diagram that illustrates a preferred embodiment of the peer search system. A user ("requester") 10 uses the user interface 11 (FIG. 1) to search for peers via the application implemented in server 12 which in turn connects with the search engine in server 16. The search engine can comprise software and/or hardware resident in the server 16. A peer relevancy algorithm 30 is a key component of the search engine, and is described in greater detail in the flowchart of FIG. 4.

When a user requests to be matched with potential peers via the user interface, the search engine searches the peer profiles search index 16 using the peer relevancy algorithm. Matches are located by the peer relevancy algorithm based on the tags stored in the peer profiles search index and their values, and a list of suitable peers is returned to the application at server 12. Server 12 then passes the matched peers to the user 10 via the user interface. In a preferred embodiment, the peer matches are displayed to the user via a computer display. The user interface allows the user to view each of the peer matches and to drill down for further information relating to each peer match. After reviewing the peer matches in this manner, the user can decide which match(es) would potentially be most helpful, and commence a procedure for contacting each such match.

Figure 4:
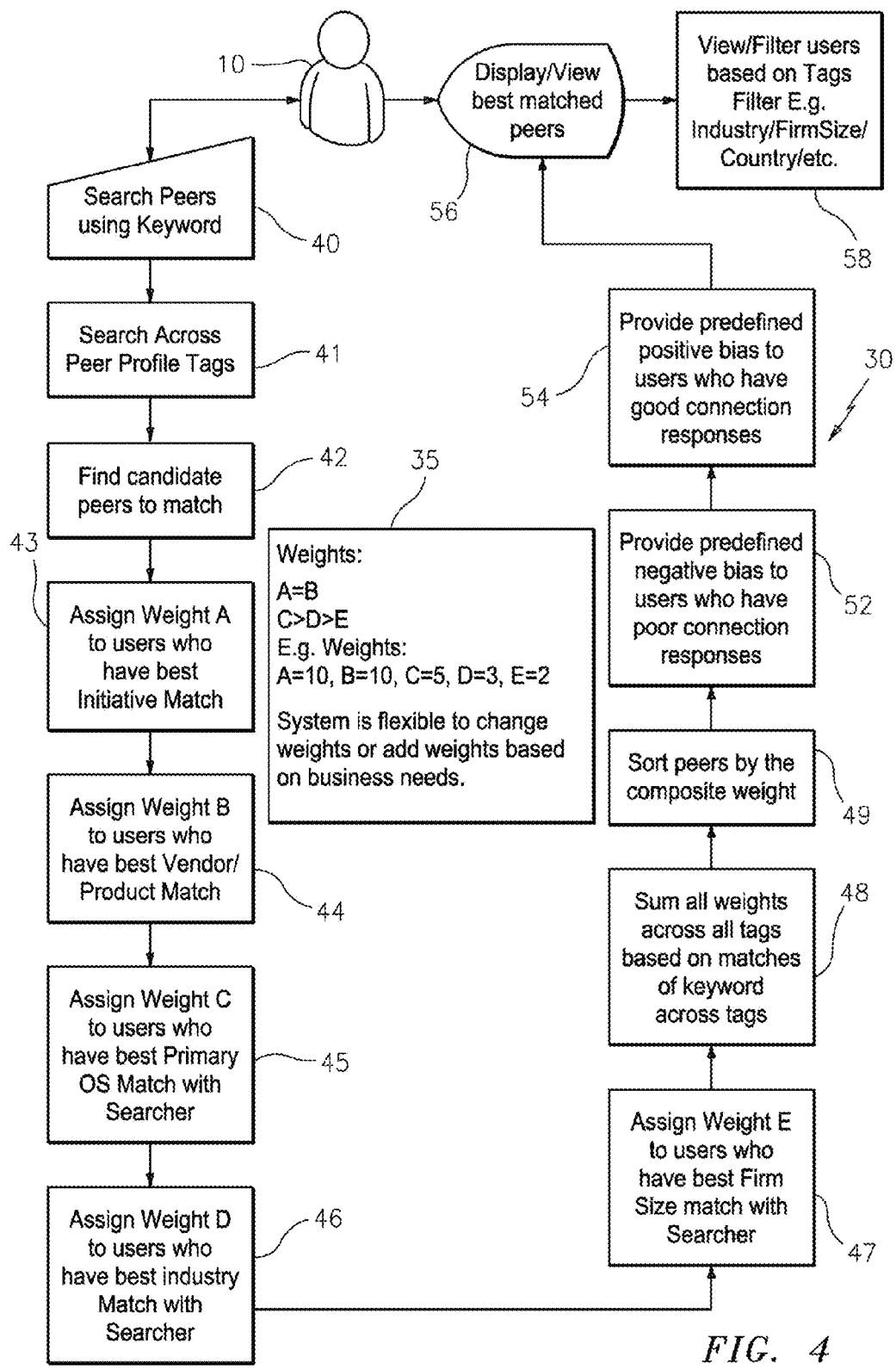
FIG. 4 is a flowchart of the peer relevancy algorithm.

The flowchart of FIG. 4 provides details on the matching and sorting of suitable peers on the search engine using tags and their values. The user 10 can commence a search for peers having profiles within the peer profiles search index in server 16 using keywords, as indicated at box 40. The keywords entered are used by the search engine to search across peer profile tags stored in the peer profiles search index 16, as indicated at box 41. The search engine finds candidate peers that match the search criteria (box 42) and begins assigning weights to the different candidate peers based on which ones have the best matches to the requester's needs in different categories. In particular, at box 43, a first weight "A" is assigned to candidate peers that have a best initiative match with the requester. The "initiative" can be, for example, a project or venture that the user is currently working on for an enterprise such as an employer.

At box 44, a second weight "B" is assigned to candidate peers who have a best vendor/product match with the requester. At box 45, third weight "C" is assigned to candidate peers who have a best primary operating system (OS) match (e.g., Windows, Mac OS X, SunOS, Linux, Unix, etc.) with the requester. A fourth weight "D" is assigned to candidate peers who have a best industry match with the requester, as indicated at box 46. At box 47, a fifth weight "E" is assigned to candidate peers who have a best firm size match (e.g., size of employer by number of employees, sales revenue, etc.) with the requester. Once all of the weights are assigned, they are summed across all tags based on matches of the keyword across the tags (box 48).

It should be appreciated that the categories of information to which weights are assigned at boxes 43-47 are not the only categories for which such weights can be assigned. Different categories of information can be added to or substituted for those shown, as will be apparent to those skilled in the art. Moreover, the system is flexible to change and/or add weights based on the needs of the business using the peer search system of the invention. In the illustrated embodiment, as shown at box 35 of FIG. 4, weight A=B, and weight C>D>E. For example, numerical weights can be assigned as follows: A=10, B=10, C=5, D=3, and E=2. As these are just examples, the weights actually assigned in a particular system may be different. Moreover, the system can be configurable to assign different weights to different categories as needed.

As an example of the weighting process, assume that a peer has the following profile:
Initiative: Application Architecture
Current Status Active
Description: PANAMA—fully redundant, zero downtime architecture.
Initiative: Data Management & Integration
Vendor Name SampleX Corporation
Current Status New
Description: Integration of CorporationA and CorporationB-.com site
Initiative: Web Application Development & Management|Edit|Remove
Vendor Name ExampleZ, Inc
Current Status Fully Implemented
Description: Implemented the CorporationB Search feature using ExampleZ Search Engine.
Product: SampleX Liquidlogic
Vendor Name: SampleX Corporation
Product/Service Category: Application Integration and Middleware Software
Your Involvement Planning and Selection, Negotiation, Implementation, Maintenance/Support
Primary Operating System: Red Hat Linux (Server)
Recommendation: Very Likely
Product: Windspeed
Vendor Name ExampleZ, Inc
Product/Service Category: Search and Information Access
Your Involvement Planning and Selection, Negotiation, Implementation, Maintenance/Support
Primary Operating System: Red Hat Linux (Server)
Recommendation: Confidential
Comments: Full Life Cycle Implementation with Corporation B.com application When a user types in a keyword to search for peers the system will try to match on the Initiative, Vendor Name, Description, Primary Operating System, Product/Service Category, Product fields (a/k/a tags), Comments, etc. across all peers. Depending on where the match occurs a different weight might be given. For example, if a user types in the keyword "Application" matches will result on:
  Initiative: Application Architecture—assign a weight of 10
  Initiative: Web Application Development and Management, assign a weight of 10
  Product/Service Category: Application Integration and Middleware Software, assign a weight of 5
  Comments: Full Life Cycle Implementation with CorporationB.com application, assign a weight of 1
All the weights are then summed to provide a unique score for each peer.

Once the weighting process is complete, each candidate peer will have a particular composite weight (the peer's "score"), and the peers are then sorted based on the composite weights as indicated at box 49. The sorted list of peers can then be presented to the requester. However, before presenting the list of peers to the requester, another series of steps can be provided to further increase the likelihood that a suitable match will be found.

Specifically, some users who have a good past connection history with peers may be more inclined to respond to a match request than others. The system can therefore keep track of the past history of users in responding to requests to connect to another user using the system. With this information, the system can provide a pre-defined negative bias to users that have poor connection responses, as indicated at box 52, and provide a pre-defined positive bias to users who have good past connection responses, as indicated at box 54. The bias can be implemented by simply increasing the weight assigned to good past responders and by decreasing the weight assigned to poor past responders. Such a bias can be added to or subtracted from the current weight for a given peer based on a fixed "bias" value or a percentage modification of the current weighting for each peer match. The bias for each peer match can then be presented to the requester using a flag or other indicia when the match is presented to the requester (e.g., via a computer display associated with the user interface) or by re-sorting the list of peer matches to account for the modified weight resulting from the bias. Alternatively, the sorting step 49 can be done subsequent to the bias steps 52 and 54, instead of prior to step 52 as shown in FIG. 4.

After the list of peer matches has been sorted, it is presented to the requester 10 using, e.g., a computer display or the like, as indicated at box 56. The requester can also use the user interface to view and/or filter proposed matches based on the tags as indicated at box 58. Such filtering can be done, for example, with respect to the requester's (and/or the peers') industry, firm size, country, job role, vendor, product service/category, etc. The requester can also filter for peers in his own company if he so chooses.

Figure 5:
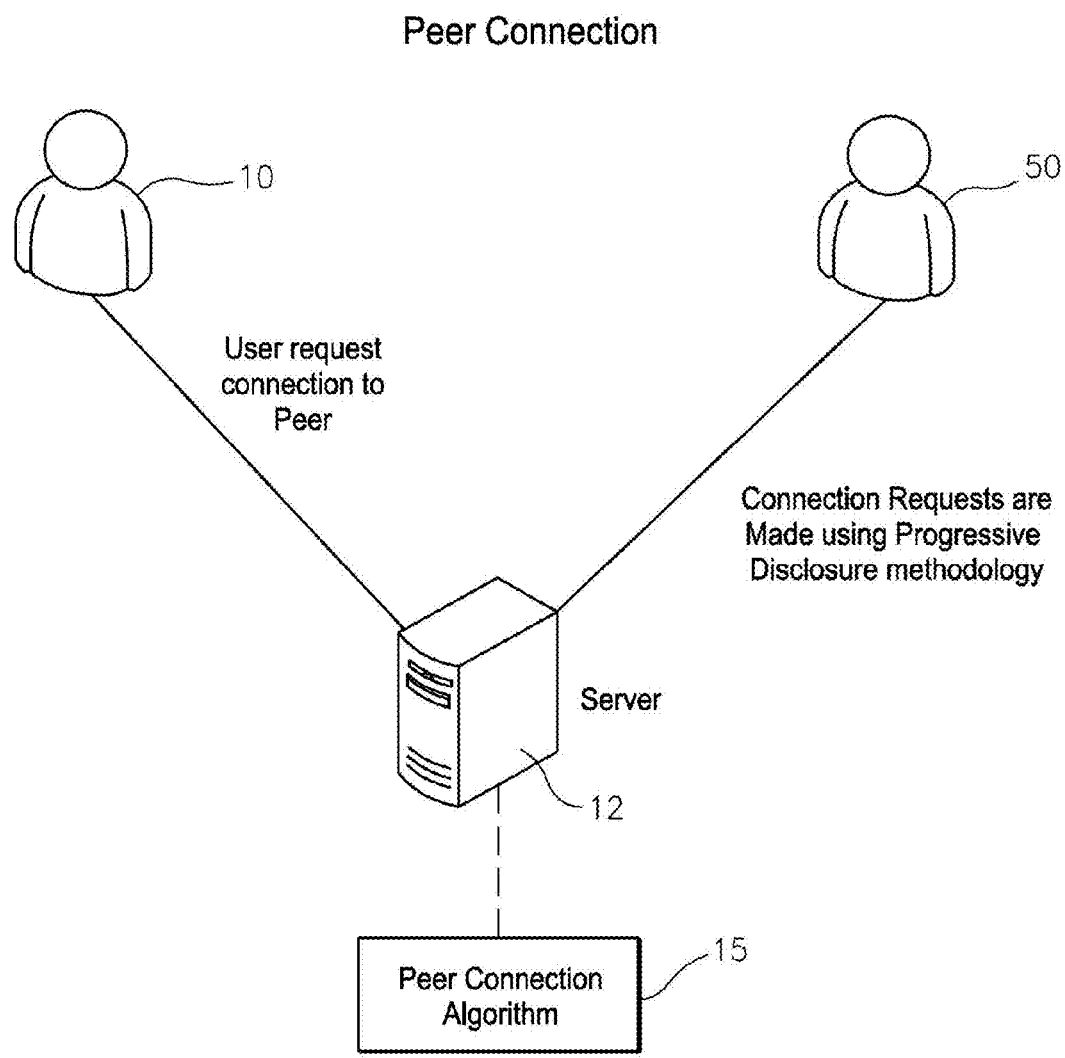
FIG. 5 is a block diagram of components of the inventive system relating to the peer connection algorithm.
Figure 6:
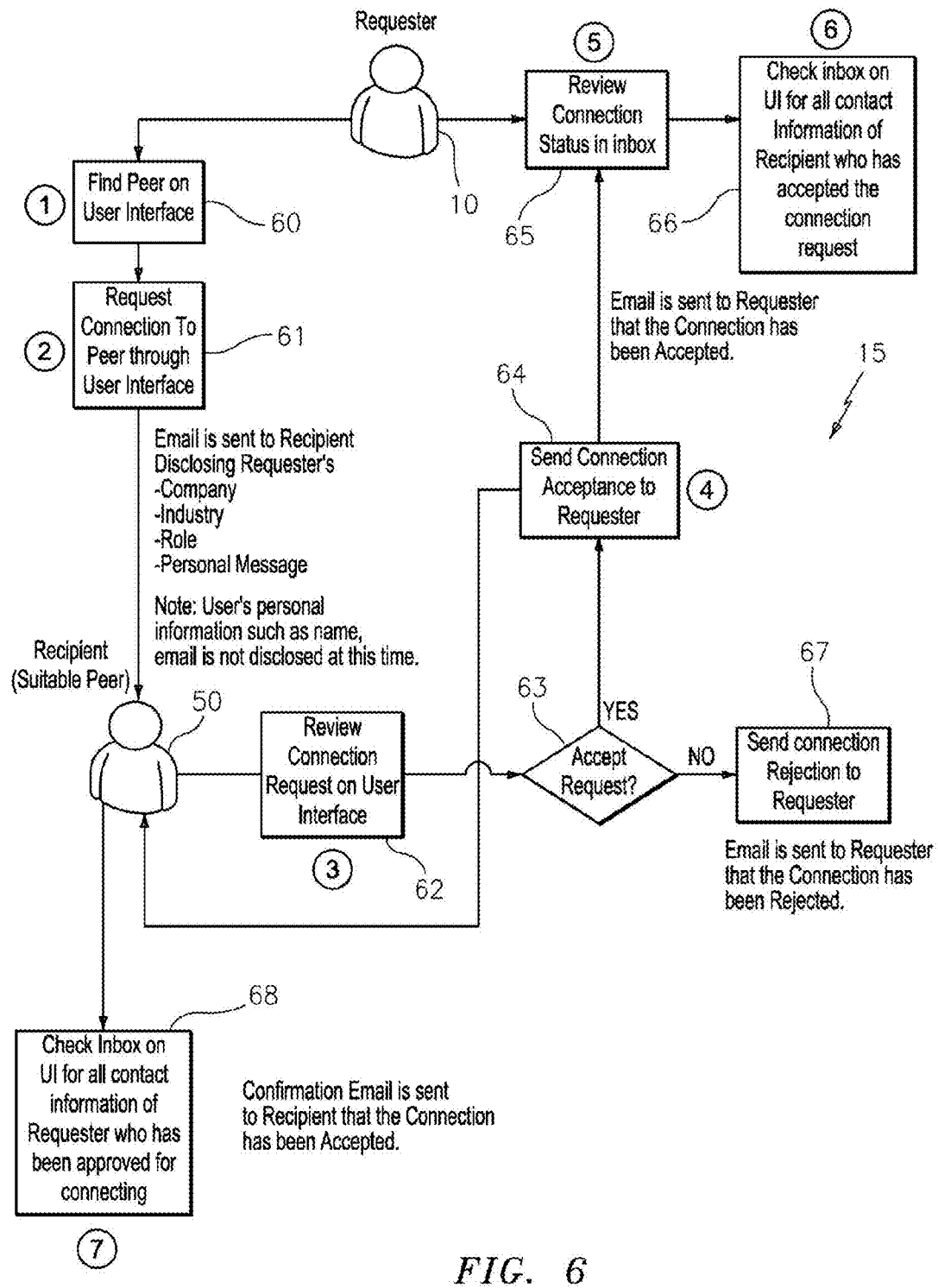
FIG. 6 is a flowchart of the peer connection algorithm.

FIG. 5 is a block diagram illustrating the connection of a requester to a peer. After going through the peer search process and receiving a list of the best matched peers, as described in connection with FIG. 4, the requester 10 can request connection to one or more peers that have been identified as potentially suitable matches. The request for a connection may be made to the server 12 via the user interface 11 (shown in FIG. 1). A peer connection algorithm, described in greater detail in FIG. 6, is associated with the server 12 in order to make a connection request to a particular peer 50 identified by the requester. The connection requests are made using a progressive disclosure methodology in accordance with the invention, in which the respective parties (peer and requester) only learn of the other's identity after certain requirements have been met.

As indicated in FIG. 6, the requester 10 first uses the user interface to find a potential peer to contact, as indicated at box 60. A request for a connection to that peer is then made, again via the user interface as indicated at box 61. The peer connect algorithm 15 (FIG. 5) then sends an email to the recipient peer indicating that someone wants to contact the recipient and disclosing various information about the requester such as, for example, the requester's company, industry, role in the company/industry and a personal message from the requester. The requester's personal information, such as name, email address, etc. is not disclosed at this time.

Upon receipt of the email, the recipient peer 50 reviews the connection request using a provided user interface, as indicated at box 62. If the recipient decides not to accept the request for a connection with the requester (box 63), a connection rejection is sent as indicated at box 67. This rejection can comprise an email sent to the requester that the connection has been refused. The system can keep a record to note that the recipient peer has rejected a communication, which record can be used to provide a corresponding bias with respect to that recipient peer (as described in connection with box 52 of FIG. 4) should that recipient continue to refuse connections when contacted.

If the recipient peer 50 accepts the request for a connection, a connection acceptance is sent to the requester 10, as indicated at box 64. The acceptance can comprise an email sent to the requester indicating that the connection has been accepted. A record can be kept by the system regarding the acceptance by the particular recipient peer, for future use in providing a corresponding bias as described in connection with box 54 of FIG. 4.

Upon acceptance of the connection request by the recipient, an introductory email is sent by the application on server 12 to both the recipient and requester with the contact information of both parties. Alternatively, the requester can also review the connection status (box 65) and obtain contact information of the recipient peer via the user interface. At this point, the requester can directly contact the recipient peer to commence a business relationship. For example, the requester can ask the recipient peer to provide advice and/or assistance in a particular technology or subject area, or to collaborate on a project that the requester is working on. In one embodiment of the system, the recipient peer 50 will be able to obtain contact information for the requester via his user interface, as indicated at box 68, as soon as the connection has been accepted by the recipient peer.

Figure 7:
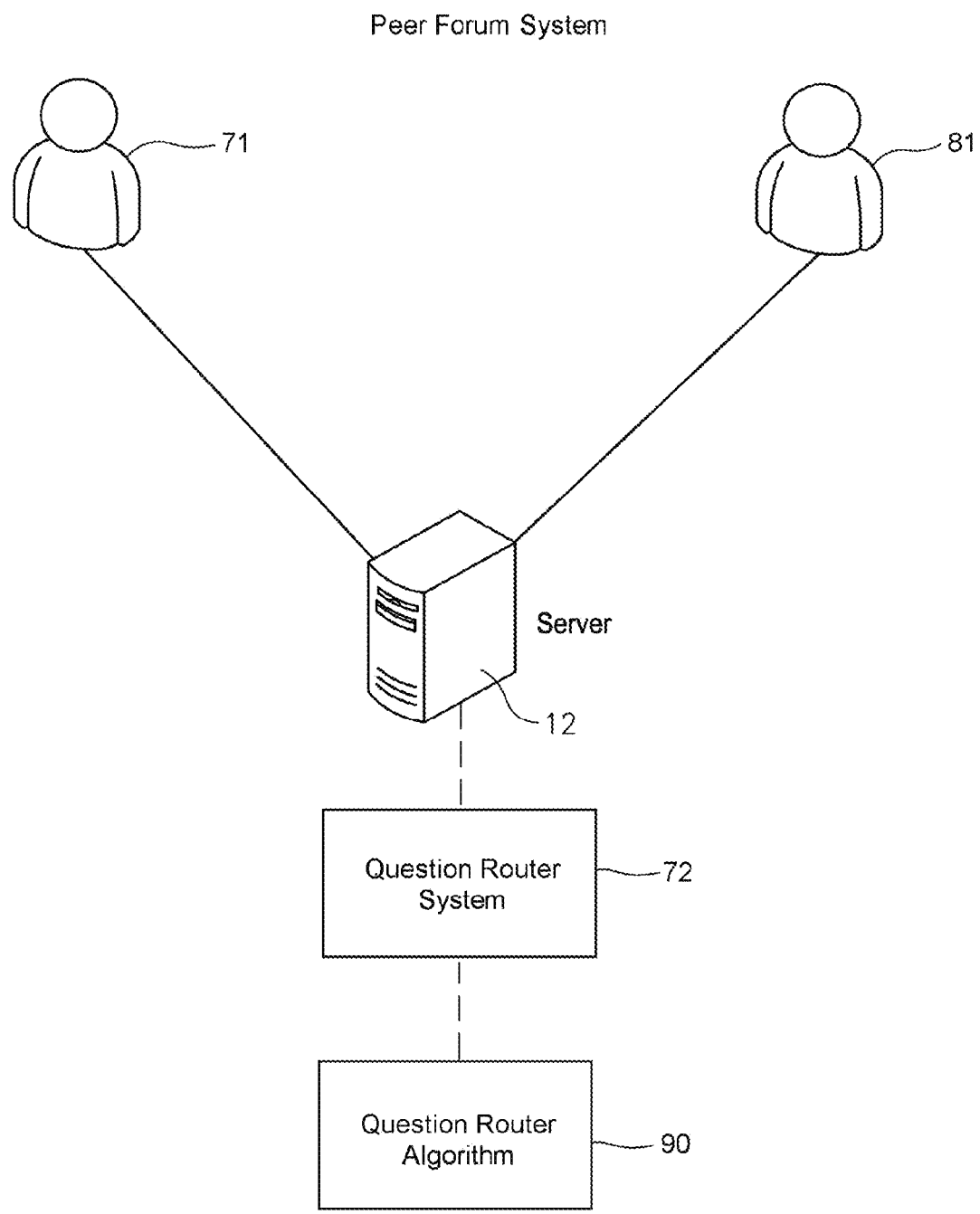
FIG. 7 is a block diagram of components of the inventive peer forum system.

FIG. 7 is a block diagram illustrating a peer forum system of the present invention. The peer forum system is designed to make asking questions and answering questions easy and quick. In a preferred embodiment, the process is automated and resident on the server 12, and there is no substantial human intervention. In the peer forum system, clients 71 utilize a user interface to access online forums that are restricted to a qualified set of individuals. The clients 71 register, provide profile information, and login to access the forums. The clients can then ask questions and obtain answers from a highly qualified set of individuals, namely peer experts 81. The peer experts answer questions when they visit the peer forums. The peer forum system also consists of the question router 72, which operates via a question router algorithm 90. The question router helps to automatically route the questions to relevant peers. Routing the questions automatically helps the forum system to increase the question and answer rates without any manual intervention by the community managers.

Figure 8:
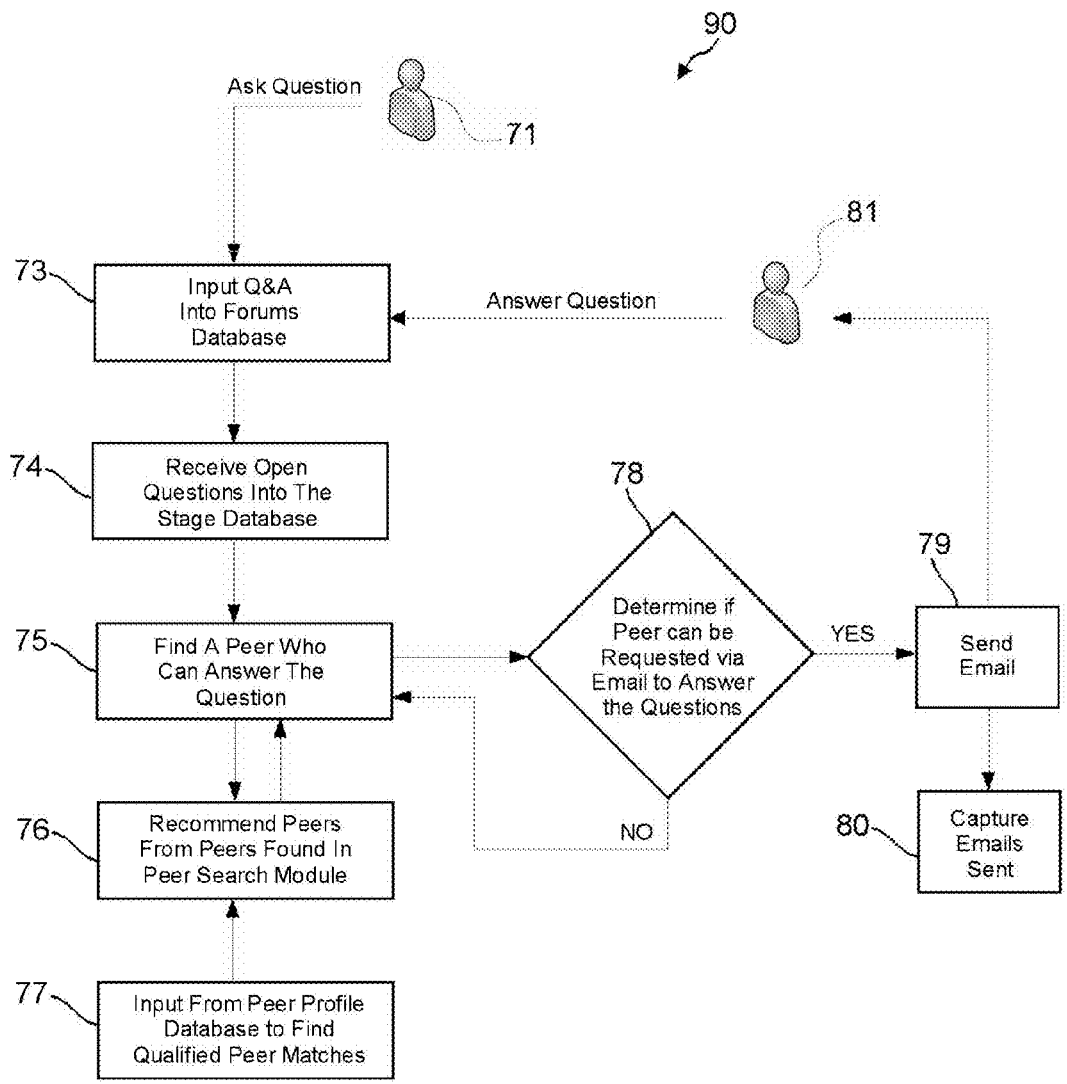
FIG. 8 is a flowchart of a question routing algorithm of the question router.

FIG. 8 is a flowchart illustrating the operation of the question router algorithm 90. The client 71 accesses the question router algorithm 90 through the question router 72. Questions are input, as indicated at box 73, into a forums database that captures all the questions input by clients. Also, answers to questions are input by peer experts 81 into the forums database. At any given point in time, questions or answers can be looked up in the forums database.

Open questions in the forums database are then received into a stage database, as indicated at box 74. Open questions are questions for which there have been no answers or replies. A reply may not constitute an answer and may simply be a request for additional information. Unanswered questions from the forums database are received into the stage database on a periodic basis, for example, every few minutes, every few hours, or every few days. It is also possible to pull all questions (open or not) and all answers and replies on a periodic basis.

The open questions from the stage database 74 are then received into a peer search module, as indicated at 75, to find peer experts 81 who can answer the questions. The peer search module is operatively associated with a recommendation engine, which recommends peers, as indicated at box 76, from the peer search module who can best answer the questions. This is accomplished e.g., using a combination of collaborative and cluster filtering algorithms. The recommendation engine takes into consideration both the explicit and implicit profiles of a peer to figure out the peer's subject matter expertise. The recommendation engine also takes into account the propensity to answer questions on the peer forum systems and the subject matter expertise the peers demonstrate on the peer forum system. If the peer's subject matter expertise is the same as the open question, then the peer becomes a candidate to answer the open question.

Input is provided to the recommendation engine via a peer profile database, as indicated at box 77, so that qualified peer matches can be found. The peer profiles database stores an explicit and an implicit profile of the peer expert 81. An explicit profile comprises information that generally defines the peer expert 81 based on his own input. This is usually derived from registration forms where the peer expert 81 has input his industry experience, job titles and duty descriptions, size of company, company name, projects he is working on, vendors he is working with, etc. The implicit profile of the peer expert 81 is based on his behavior on a web site through which the present system is accessed. This might include the research documents he has read, the alerts he has set up, the search terms he has used, etc.

After receiving open questions into the peer search module and receiving the peer recommendation from the recommendation engine, a determination is then made (box 78) using rules regarding whether or not a candidate peer expert 81 recommended and entered into the peer search module can be sent an email encouraging the peer expert 81 to answer the open questions. There might be rules that limit the number of emails that a peer expert 81 can receive, such as "only send three emails per person per week." The rules can include any number of criteria such as whether a peer expert is likely to answer questions, a peer has unsubscribed to these emails, whether a peer expert is in the same industry, etc. The peer experts 81 who can get past these rules become eligible to be sent emails, requesting them to answer the questions. If a peer expert 81 cannot get past the rules, the next best peer expert is selected for answering the questions. The email can be sent to one or more peer experts as per the configuration of the system.

If a peer expert 81 can pass the rules, an email delivery system sends an email, as indicated at box 79, to the peer expert 81 requesting him to answer the open questions. The email delivery system consists of email templates and email sending systems. A touch database captures all the sent emails sent to the peer experts 81, as indicated in box 80. The data from the touch database and indicative of the emails sent to the peer experts 81 will be used in the future to determine the number of emails sent to peer experts 81 and to adjust the rules.

Peer experts 81 open the emails they receive from the email delivery system and find questions they can answer. In a preferred embodiment, these emails include links which will take the peer experts 81 to the open question where they can comment on or answer the question.

It should now be appreciated that the present invention provides an interactive peer directory system that enables professionals to find suitable peers for assistance with, advice on, and/or collaboration on a particular project. Although the peers are generally people that work for other companies or are independent consultants, academics, or the like, they can also be employed by the same company as the requester.

A user interface enables user profile information to be entered and stored in a profiles database. A search engine appends tags to the user profile information. A search index associated with the search engine stores tagged user profile information in an indexed form. A peer relevancy algorithm associated with the search engine searches for candidate peers among the indexed user profile information stored in the search index. The peer relevancy algorithm assigns weights to candidate peers based on different categories of the indexed user profile information, and selects peer matches based on the assigned weights.

Once the system provides one or more potential peer matches to the requester, the requester can initiate a connection request to a selected peer. If the selected peer accepts the connection request, the requester can contact the peer directly. In order to provide matches that are most likely to accept a connection request, the system can keep track of which candidate peers have a history of accepting requests to connect and which have a history of refusing to connect. The list of potential matches provided to the requester can be biased to favor those that have a tendency to accept connection requests.

Moreover, question and answer rates can be increased in accordance with the invention to maintain a dynamic and healthy community of users. To achieve this, open questions are pulled from forums and a recommendation engine is used to find peer experts to answer the open questions. Emails or notifications are then sent to the peer experts to solicit their response to the questions.

Although the invention has been described in accordance with a preferred embodiment, various other embodiments can be provided and are intended to be included within the scope of the claims.

What is claimed is:

1. A peer forum system for routing questions and answers among peers having common interests, the peer forum system being implemented on a digital computer network and comprising:
    a user interface operatively associated with a digital computer for enabling user information to be input via the digital computer network; and
    a question router associated with the digital computer network, said question router being adapted to automatically route questions to relevant peers, thereby increasing question and answer rates provided by the peer forum system, said question router comprising:
        a forums database for capturing questions and answers provided via the peer forum system;
        a stage database associated with the forums database for pulling questions from the forums database and storing the questions;
        a peer search module associated with the stage database for pulling the questions from the stage database and finding peers who can answer the questions;
        a recommendation engine operatively associated with the peer search module for recommending peers who can answer the question;
        a peer profile database associated with the recommendation engine that stores explicit and implicit profiles for each of the peers;
        a set of throttle rules associated with the peer search module for determining if peers found by the peer search module are eligible to be sent a communication requesting the peers to answer the question; and
        a communication delivery system for delivering the communication to eligible peers;
    wherein:
        the implicit profiles for the peers comprise user-related information relating to independent behavior of the peers on the digital computer network; and
        the user-related information relating to independent behavior of the peers on the digital computer network comprises at least one of search terms used, documents read, and alerts set up on the digital computer network.

2. The peer forum system of claim 1, wherein the recommendation engine comprises a collaborative and cluster filtering algorithm.

3. The peer forum system of claim 1, further comprising a profile which includes the peer's propensity to answer questions on the system.

4. The peer forum system of claim 3, wherein said profile further includes the peer's demonstrable subject matter expertise on the peer forum system.

5. The peer forum system of claim 1, further comprising a profile which includes the peer's demonstrable subject matter expertise on the peer forum system.

6. The peer forum system of claim 1, wherein said question router uses past contribution histories of peers to determine relevant peers who are more likely to answer questions routed to them.

7. The peer forum system of claim 1, wherein the explicit profiles for the peers comprise user-related information derived from registration information provided by the peers.

8. The peer forum system of claim 1, further comprising:
 a touch database for capturing communications delivered by the communication delivery system and storing the communications for subsequent use in counting the communications to eligible peers and for deriving the throttle rules.

9. A method for routing questions and answers among peers having common interests, the method being carried out on a digital computer network and comprising the steps of:
 capturing a question asked by a user in a forums database;
 storing the question from the forums database in a stage database;
 transferring the question from the stage database into a peer search module;
 calculating recommendations of peers who can answer the question by a recommendation engine operatively associated with the peer search module;
 providing a peer profile database associated with the recommendation engine that stores explicit and implicit profiles for each of the peers;
 ascertaining one or more peers capable of answering the question from the peer search module; and
 requesting via an electronic communication that one or more peers answer the question;
 wherein:
  the implicit profiles for the peers comprise user-related information relating to independent behavior of the peers on the digital computer network; and
  the user-related information relating to independent behavior of the peers on the digital computer network comprises at least one of search terms used, documents read, and alerts set up on the digital computer network.

10. The method of claim 9, wherein the step of ascertaining one or more peers capable of answering the question comprises using one or more filtering algorithms to match a field of expertise of the peer to subject matter relating to the question.

11. The method of claim 10, wherein the step of using one or more filtering algorithms comprises providing input related to the peers to the one or more filtering algorithms.

12. The method of claim 11, wherein the step of providing input related to the peers to the one or more filtering algorithms comprises:
 considering, for each peer, the explicit profile of the peer derived from registration information provided by the peer; and
 considering, for each peer, the implicit profile of the peer derived from the information relating to behavior of the peer on the digital computer network.

13. The method of claim 12, further comprising considering at least one of:
 (i) a peer's propensity to answer questions on the peer forum system, and
 (ii) a peer's subject matter expertise demonstrated on the peer forum system.

14. The method of claim 9, further comprising the step of determining if the one or more peers ascertained can be requested to answer the question.

15. The method of claim 9, further comprising capturing the electronic communication requesting that the one or more peers answer the question.

16. The method of claim 9, further comprising receiving an answer in response to the step of requesting that the one or more peers answer the question.

* * * * *